No. 748,943. Patented January 5, 1904.

UNITED STATES PATENT OFFICE.

JULIUS GRESLY, OF LIESBERG, SWITZERLAND.

PROCESS OF MANUFACTURING HYDRAULIC CEMENT.

SPECIFICATION forming part of Letters Patent No. 748,943, dated January 5, 1904.

Application filed February 26, 1903. Serial No. 145,291. (No specimens.)

*To all whom it may concern:*

Be it known that I, JULIUS GRESLY, chemist, a citizen of the Swiss Republic, and a resident of Liesberg, canton of Berne, Switzerland, have invented a new and useful Process for the Manufacture of Hydraulic Cements, of which the following is a full, clear, and complete specification.

My hereinafter-described process concerns the manufacture of hydraulic cements which have very noticeable qualities when used as mortar—as, for instance, constance of volume in the air as well as under water and great resistance against atmospheric influences. The parent materials are, on the one hand, clays—as kaolin, pipe clays, pozzuolana, and the like or certain industrial refuses, as slags and the like—and, on the other hand, calcium carbonate, which may contain clay or be pure, natural, or artificial, and which can be employed without special preliminary treatment or after having been burned. If the parent materials contain only a slight quantity of iron, if any, the cements obtained are white and because of their favorable qualities are especially adapted for flat or plastic decorative works intended to be kept in the open air.

My new process of making hydraulic cements can be drived from the chemical composition and the method of manufacture of the Roman cements, which have been produced hitherto only from natural minerals.

By an analysis of the best French-Roman cements the following average of composition is obtained after the separation of those admixtures which are to be considered as secondary; silicic acid, ($SiO_2$,) twenty-three per cent.; alumina, ($Al_2O_3$,) oxid of iron, ($Fe_2O_3$,) thirteen per cent.; oxid of calcium, (CaO,) oxid of magnesium, (MgO,) fifty-nine per cent.; sulfuric acid, ($SO_3$,) three per cent. From these figures results the following proportion of lime (and magnesia) and of those materials which are to be considered as acids:

$$\frac{SiO_2 + Al_2O_3 + SO_3}{CaO + MgO} = \frac{39}{59}$$

The experiment of constructing synthetically a cement of these proportions, in which experiment iron oxid is replaced by alumina and magnesia by lime, while sulfuric acid is supposed combined with lime to form plaster, gives the following result:

For the formation of bicalcic combinations of the silicic acid, as well as of the alumina, there are necessary For 23 parts $SiO_2$ .......... 43 parts CaO
For 13 parts $Al_2O_3$ ........ 14 parts CaO
For  3 parts $SO_3$ .......... 2 parts CaO For 39 parts of acids ...... 59 parts of lime.

$$\frac{SiO_2 + Al_2O_3 + SO_3}{CaO} = \frac{39}{59}$$

The combined result corresponds thus completely with that of the Roman cements. If this supposition is correct, the general formula $$a(SiO_2 2CaO) + b(Al_2O_3 2CaO) + c(SO_3 CaO) = a(SiO_2) + b(Al_2O_3) + c(SO_3 CaO) + (2a+2b)CaO$$

gives the molecular weights of mixtures which thus can be calculated and produced and which must give hydraulic cements after being burned like Roman cements without being sintered. In a very simple mode of producing such a cement kaolin and marble or coral lime are the parent materials, while plaster may be left out. These materials are practically pure and can be regarded as chemical individuals.

The composition of kaolin is well known to be $2(SiO_2)Al_2O_3 + 2H_2O$ and its molecular weight is two hundred and fifty-nine. The molecular weight of calcium carbonate is one hundred. In the general formula, $a$ is two and $b$ is one, or the necessary quantity of lime is $2 \times 2 + 2 \times 1 = 6CaO$ or $6CaCO_3$. One molecule of kaolin or two hundred and fifty-nine parts, by weight, of the same need thus six molecules or six hundred parts, by weight, of carbonate of calcium.

If the aforesaid kaolin and powdered limestone are intimately mixed, brought into a proper form—for instance, in the usual brick form—and burned within a suitable furnace, preferably at a temperature of about 1,150° to 1,350° centigrade, a white burned product is obtained, which when in brick or other piece form reacts upon water in a manner hardly perceivable from the exterior, while when in a state of powder said product possesses very valuable hydraulic qualities. The manufacture of technically useful cements does not, however, depend upon the exact employment of the stated temperatures. Thus very valuable products can also be obtained by lower temperatures if the action of the fire is proportionately prolonged.

It is further not necessary that the exact proportion of the mixture as stated above should be employed—i. e., two molecules of lime and one of acids, ($SiO_2$ and $Al_2O_3$.) As far, however, as I can judge from experience the strongest and most valuable cements are obtained by the use of the said proportion.

As soon as the amount of lime expressed by molecules contained in the raw mixture becomes greater than the sum of all acid parts together (also expressed by molecules) products are formed which harden hydraulically. If thus a given aluminium silicate adapted for this manufacture and containing $a$ molecules $SiO_2$ and $b$ molecules $Al_2O_3$ is suitably mixed with $d$ molecules of powdered limestone, a burned product with hydraulic qualities must arise if $d$ is greater than the sum of $a$ and $b$. If $d$ is equal to $2a+2b$, the normal mixture for the production of cement is obtained. If the amount of lime is increased in comparison to that of the acids, the burned product when in brick form begins to become warm if wetted with water till it accepts finally the distinct character of hydraulic lime—i. e., it falls to powder from itself in moist air.

Since the proper burning of mixtures of pure clay and lime powder has some technical difficulties, especially if the amount of lime increases, small additions of sulfates, ($MSO_4$)—as plaster, sulfate of sodium, or the like—may be made to the parent materials, said sulfates serving as condensing agents. Very slight quantities of plaster (about one-fourth to one-fifth molecule) are sufficient to act very favorably upon the chemical transformations during the burning. The mixtures burned with an addition of plaster give very strong and resisting cements. Such an addition of plaster further facilitates the subsequent technically important regulation of setting or hardening.

What I claim is—

1. Process for producing hydraulic cements by burning artificially and intimately mingled mixtures of aluminium silicates with lime, especially in form of carbonate, and with a slight addition of a sulfate ($MSO_4$), wherein $a$ molecules of $SiO_2$, $b$ molecules of $Al_2O_3$, $c$ molecules of $MSO_4$ and $d$ molecules of $CaO$ are mixed in such a relation, that the number $d$ of the lime unities is greater than the sum $a+b$ of the acid unities, the burning being effected below the sintering temperature, as described.

2. Process for producing hydraulic cements by burning artificially and intimately mingled mixtures of aluminium silicates with lime, especially in form of carbonate, and with a slight addition of sulfate of calcium, wherein $a$ molecules of $SiO_2$, $b$ molecules of $Al_2O_3$, $c$ molecules of $CaSO_4$ and $d$ molecules of $CaO$ are mixed in such a relation, that the number $d$ of the lime unities is greater than the sum $a+b$ of the acid unities, the burning being effected below the sintering temperature, as described.

3. Process for producing hydraulic cements by burning artificially and intimately mingled mixtures of aluminium silicates with lime, especially in form of carbonate, and with a slight addition of a sulfate ($MSO_4$), wherein $a$ molecules of $SiO_2$, $b$ molecules of $Al_2O_3$, $c$ molecules of $MSO_4$ and $d$ molecules of $CaO$ are mixed in such a relation, that the number $d$ of the lime unities is $2(a+b)$ i. e., equal to double the number of the acid unities, the burning being effected below the sintering temperature, as described.

4. Process for producing hydraulic cements by burning artificially and intimately mingled mixtures of aluminium silicates with lime, especially in form of carbonate, with a slight addition of sulfate of calcium, wherein $a$ molecules of $SiO_2$, $b$ molecules of $Al_2O_3$, $c$ molecules of $CaSO_4$ and $d$ molecules of $CaO$ are mixed in such a relation, that the number $d$ of the lime unities is $2(a+b)$ i. e., equal to double the number of the acid unities, the burning being effected below the sintering temperature, as described.

In witness whereof I have hereunto signed my name, this 6th day of February, 1903, in the presence of two subscribing witnesses.

JULIUS GRESLY.

Witnesses:
 GEO. GIFFORD,
 AMAND RITTER.